(12) United States Patent
Kobayashi et al.

(10) Patent No.: US 7,171,242 B2
(45) Date of Patent: Jan. 30, 2007

(54) METHOD AND APPARATUS FOR PERFORMING NOISE CONTROL IN A TELEMATICS SYSTEM

(75) Inventors: Junichi Kobayashi, West Bloomfield, MI (US); Sue Bai, Wixom, MI (US)

(73) Assignee: Nissan Technical Center North America, Inc., Farminton Hills, MI (US)

( * ) Notice: Subject to any disclaimer, the term of this patent is extended or adjusted under 35 U.S.C. 154(b) by 488 days.

(21) Appl. No.: 10/621,320

(22) Filed: Jul. 18, 2003

(65) Prior Publication Data

US 2005/0014487 A1    Jan. 20, 2005

(51) Int. Cl.
*H04M 1/00*    (2006.01)

(52) U.S. Cl. .................. 455/563; 455/401; 455/3.06; 455/501; 455/63.11; 455/575.9

(58) Field of Classification Search ............... 455/563, 455/401, 3.06, 501, 63.11, 67.11, 575.9
See application file for complete search history.

(56) References Cited

U.S. PATENT DOCUMENTS

| | | | |
|---|---|---|---|
| 6,198,947 | B1 | 3/2001 | Barber |
| 6,240,347 | B1 | 5/2001 | Everhart et al. |
| 6,282,491 | B1 | 8/2001 | Bochmann et al. |
| 6,426,709 | B1 | 7/2002 | Becker et al. |
| 6,505,161 | B1 | 1/2003 | Brems |
| 2003/0191646 | A1* | 10/2003 | D'Avello et al. ........... 704/270 |
| 2004/0021351 | A1* | 2/2004 | House ................... 297/217.4 |

FOREIGN PATENT DOCUMENTS

| | | |
|---|---|---|
| JP | 11-250378 A | 9/1999 |
| JP | 11-250383 A | 9/1999 |
| JP | 11-312285 A | 9/1999 |
| JP | 2001-045181 A | 2/2001 |

OTHER PUBLICATIONS

U.S. Appl. No. 10/402,157, filed Mar. 31, 2003, Tan et al.
News—GDT and TrafficCast to Deliver Real-Time Traffic Information, www.itsa.org/itsnews.nsf, retrieved from Website Mar. 25, 2003, pp. 1 and 2.
News—Product Innovations Drive the Emerging Automotive Entertainment and Navigation Systems Market, www.itsa.org/itsnews.nsf, retrieved from Website Mar. 25, 2004, pp. 1-3.
News—Communications Industriy Considers Measures to Ensure it Meets the Needs of Public Safety During Crisis, www.itsa.org/itsnews.nsf, retrieved from Website Mar. 25, 2003, pp. 1-3.

(Continued)

*Primary Examiner*—Matthew Anderson
*Assistant Examiner*—Minh Dao
(74) *Attorney, Agent, or Firm*—Foley & Lardner LLP

(57) ABSTRACT

A method and apparatus for accessing information in a wireless network is provided by determining whether a wireless connection from a mobile platform to a server is a phone call or a telematics call, selecting one of a phone call filter and a telematics filter based on the wireless connection determination, and filtering a voice signal for the wireless connection with the selected filter. The method and apparatus provides techniques for adapting a noise cancellation ratio to different types of wireless connections, including a hands-free phone mode and a telematics mode.

22 Claims, 3 Drawing Sheets

OTHER PUBLICATIONS

GM—A Leader in Telematics OnStar® In-Vehicle Communication Service, Automotive Newsletter, global.his.com/news/auto2.html, retrieved from Website Feb. 12, 2003, pp. 1-2.

Bezel, Hardware Bezel and Faceplate Keys, msdn.microsoft.com/library/en-us/apcintro/htm/intro_3.asp?frame-true, retrieved from Website Feb. 12, 2003, p. 1.

* cited by examiner

METHOD AND APPARATUS FOR PERFORMING NOISE CONTROL IN A TELEMATICS SYSTEM

CORRESPONDING RELATED APPLICATION

This application is related to U.S. application Ser. No. 10/402,157 by Adrian TAN et al, filed on Mar. 31, 2003 and entitled "Method And Apparatus For Controlling A Telematics System", the entire contents of which is incorporated by reference herein in its entirety.

BACKGROUND OF THE INVENTION

A. Field of the Invention

The invention relates generally to wireless communication systems, and more particularly to a method and apparatus for performing noise control in a telematics system on a vehicle.

B. Background of the Invention

Wireless communication systems for communicating between a mobile platform (e.g., a vehicle) and a base station (e.g., a server at a service provider) are known. Lately, wireless communication systems have been introduced into the consumer market as options on vehicles such as luxury sedans, family mini-vans and cars, light trucks, sport utility vehicles, and the like, to enhance the functionality of these vehicles. One such system is widely known as OnStar®, and is offered by General Motors Corp. as a subscription service on several of their consumer vehicles. Another such system is described in U.S. Pat. No. 6,282,491, which is incorporated by reference herein in its entirety.

Wireless communication systems installed by original equipment manufacturers (OEMs) in vehicles are generally known as telematics systems, the word "telematics" representing a combination of "computers" and "telecommunications" to describe a computer mounted within a vehicle to wirelessly communicate with a central service provider. These telematics systems have been used to provide real-time traffic information to drivers (see "*GDT And Traffic-Cast To Deliver Real-Time Traffic Information*", Mar. 20, 2003 by ITS America; and U.S. Pat. No. 6,426,709), to convey public safety announcements (see "*Communications Industry Considers Measures To Ensure It Meets The Needs Of Public Safety During Crisis*", Mar. 17, 2003 by ITS America), to perform navigation and entertainment features (see "*Product Innovations Drive The Emerging Automotive Entertainment And Navigation Systems Market*", Mar. 19, 2003 by ITS America) and many more applications (see generally U.S. Pat. No. 6,282,491 referenced above); the above referenced articles and patents being hereby incorporated by reference in their entirety. With telematics systems becoming more highly sought after by the consumer market, due in part to the wider variety of applications available thereon, a need exists for reducing the manufacturing cost of vehicle installed telematics systems, and for improving both their performance and their ease of use for the common consumer.

SUMMARY OF THE INVENTION

A telematics communication system for a mobile platform according to one embodiment of the present invention is provided, including a wireless communicator for wirelessly communicating with a service provider, and a controller electrically coupled to the wireless communicator. Preferably, the controller is adapted to perform the following for a wireless connection from the mobile platform to the service provider: to determine whether the wireless connection is a phone call or a telematics call, to select one of a phone call filter and a telematics filter based on the wireless connection determination, and to filter a voice signal for the wireless connection with the selected filter.

A method of exchanging information in a wireless network according to another embodiment of the present invention is provided, including determining whether a wireless connection from a mobile platform to a server is a phone call or a telematics call, selecting one of a phone call filter and a telematics filter based on the wireless connection determination, and filtering a voice signal for the wireless connection with the selected filter.

A telematics communication system according to another embodiment is provided, including means for wirelessly communicating between a mobile platform and a server, and means for selectively filtering a voice signal for the wireless communication with one of a phone call filter and a telematics call filter.

The invention thus provides numerous advantages over prior art systems wherein various parameters such as a noise cancellation ratio are set in the factory.

BRIEF DESCRIPTION OF THE DRAWINGS

Advantages and features of the invention will become apparent upon reference to the following detailed description and the accompanying drawings, of which.

DETAILED DESCRIPTION OF SPECIFIC EMBODIMENTS

Reference will now be made in detail to presently preferred embodiments of the invention. It should be appreciated that while the following description will refer to a wireless connection such as a cellular channel, other communication formats are also within the scope of this invention (e.g., a radio channel, a satellite channel, a Bluetooth™/ network channel, etc.).

Figure 1:
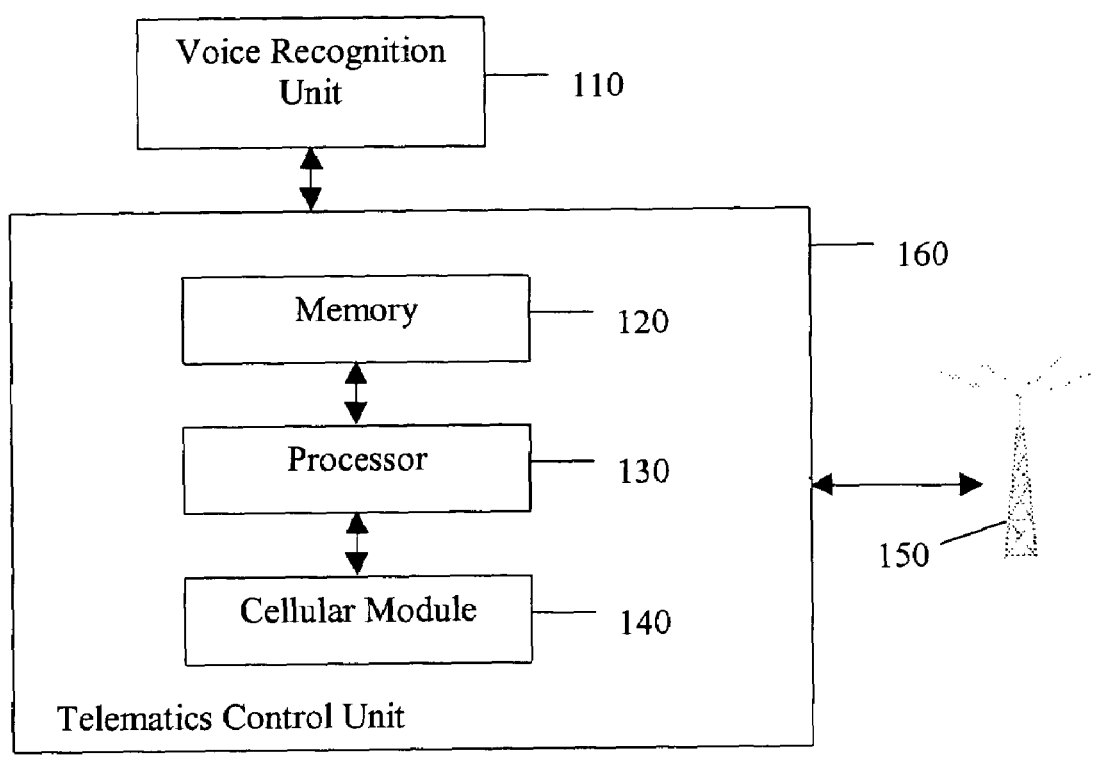
FIG. 1 is a block diagram telematics system for a vehicle according to an embodiment of the present invention.

A telematics system mountable within a vehicle according to one embodiment of the present invention, is shown in the block diagram of FIG. 1. More specifically, the telematics system includes telematics control unit 160, a wireless communicator 150 (e.g., a cellular antenna), and a voice recognition unit 110. Preferably, the telematics control unit 160 is provided by the OEM as part of the vehicle, and includes a processor 130 (such as a digital signal processor) for performing various telematics processing/control functions, a memory 120 for storing filter parameters and/or digital filters, and a cellular module 140 for wirelessly communicating via wireless communicator 150. It should be appreciated that while the voice recognition unit 110, wireless communicator 150 and telematics control unit 160 are shown in FIG. 1 as separable units, they may be partially or wholly integrated into a single unit. Additionally, the cellular module may, in some embodiments, be replaced with a stand alone Bluetooth™ cellular phone connected with the telematics control unit 160 via a Bluetooth™ connection. In this case, the telematics control unit 160 can also be referred to as a Bluetooth™ hands-free system.

Figure 2:
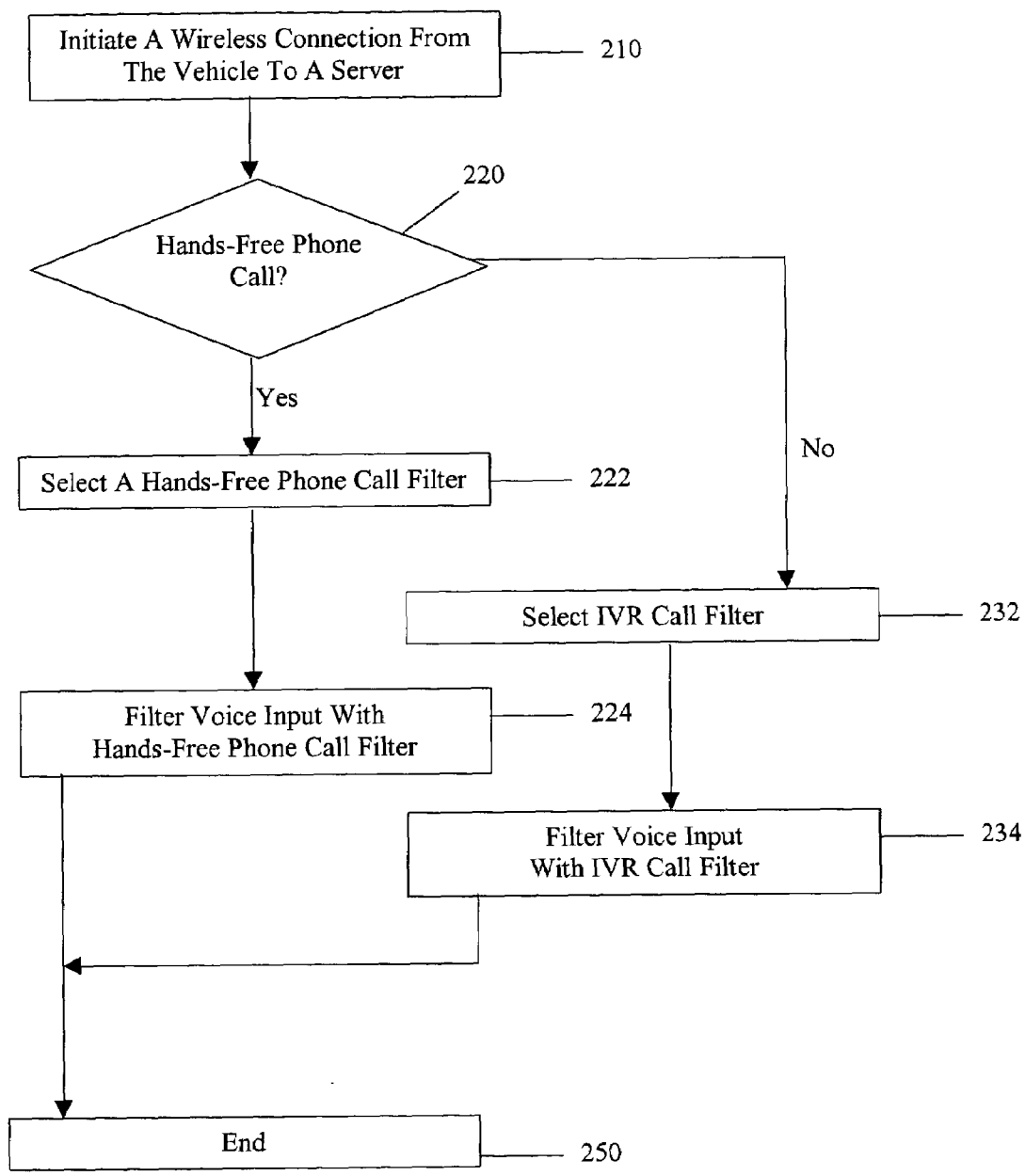
FIG. 2 is a flowchart of a method of accessing information in a wireless network according to an embodiment of the present invention.

Operation of the aforementioned telematics system according to one embodiment of the present invention will now be described in reference to FIG. 2. In step 210, a user initiates a wireless connection from the vehicle to a server, such as a server at a central service provider. By way of example, the user may initiate a wireless connection by pressing a mode control button of an audio system or other interface coupled to the telematics control unit 160, by making an appropriate voice command (e.g., "Telematics ON") received and interpreted by the voice recognition unit 110, by activating a button on a hands-free phone (not shown), etc.

In step 220, the telematics control unit 160 may then determine whether the wireless connection is a phone call (e.g., a "hands-free" phone call), a telematics call (e.g., an integrated voice recognition (IVR) call), etc. By way of example, the telematics control unit 160 may send a call status signal to the voice recognition unit 110 (FIG. 1) to automatically sense the connection type desired by the user (see exemplary voice recognition units including U.S. Pat. Nos. 6,505,161; 6,240,347; and 6,198,947 which are incorporated by reference herein in their entirety). The voice recognition unit 110 may then sense in step 220 whether the user desires a hands-free phone call (e.g., a phone call to a friend which does not involve IVR interaction). If the voice recognition unit determines in step 220 that the user desires a hands-free phone call, the telematics control unit 160 (or the hands-free system) is notified of the selection by the voice recognition unit 110, and selects a hands-free phone call filter in step 222. By way of example, the phone call filter may be stored as a digital filter in memory 120 (FIG. 1) and used by processor 130 (FIG. 1) to then filter a voice input used for the wireless connection in step 224. Once the hands-free phone call has terminated (e.g., by a user hanging up), the telematics control unit 160 may end processing (e.g., return to a default state) in step 250, may return to step 210 if the user desires a subsequent wireless connection (e.g., user terminates a hands-free phone call by activating an IVR call), or may perform further processing functions as would be readily apparent to one of ordinary skill in the art after reading this disclosure.

If in step 220 the telematics control unit 160 determines that the user does not desire a hands-free phone call, the telematics control unit 160 then selects an IVR call filter in step 232. As with the hands-free phone call filter, the IVR call filter may be stored as a digital filter in memory 120 (FIG. 1) and used by processor 130 (FIG. 1) to then filter a voice input for the wireless connection in step 234. Once the IVR call has terminated (e.g., by completion of a traffic report), the telematics control unit 160 acts in a manner as previously described upon termination of a hands-free phone call.

Additionally, according to one embodiment of the present invention, the telematics control unit 160 may determine that the user does not desire a hands-free phone call or an IVR call, and may select a non-phone call/IVR call filter(s), or may not filter the wireless connection at all. Such a situation may exist, for example, if a user activates an emergency beacon feature (e.g., a "car stolen" feature) or the like.

While the above described embodiment references distinct phone call filters and IVR filters, it should be appreciated that these filters each may include one or more filtering parameters, and/or may actually be a single filter with different parameters manipulated depending on the particular filtering required (e.g., phone call/telematics call). Filtering parameters may include, for example, noise cancellation ratios, echo cancellation ratios, talking volume adjustment of incoming and/or outgoing calls, slope filters, etc. It should be appreciated that the filter parameters may vary depending on the digital signal process or the voice control unit's manufacturer. Preferably, distinct parameter levels (or distinct filters) are used for the phone call filter and IVR filter due to different requirements for processing these connections as would be readily apparent to one of ordinary skill in the art after reading this disclosure.

For example, if the server at a service provider itself has IVR (integrated voice recognition) capability, in telematics mode the noise cancellation ratio may be lower to ensure that all voice commands are caught in IVR and eliminate unnecessary data cut by noise cancellation. On the other hand, in a hands-free phone call mode, the noise cancellation ratio may be set higher to filter out background noise and provide a clear voice.

Figure 3:
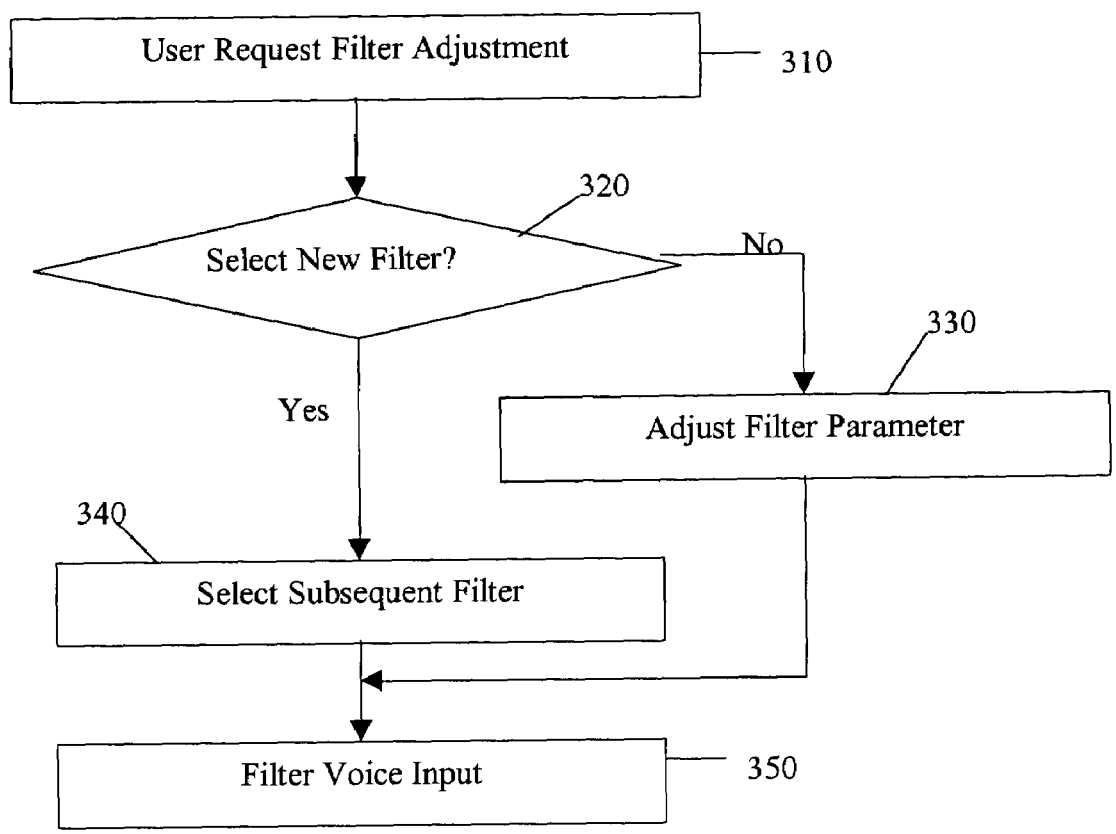
FIG. 3 is a flowchart of a method of adjusting a filter for a wireless network according to an embodiment of the present invention.

Additionally, while the processor 130 is performing filtering steps 224 and/or 234 (or any other step after a filter has been selected), a user may require filter adjustment for any number of reasons, such as dissatisfaction with the level of performance of the presently selected filter. One such method of adjusting a filter is shown in the flowchart of FIG. 3. In step 310, a user requests filter adjustment; e.g., by issuing a voice command such as "CHANGE FILTER" which is received and interpreted by voice recognition unit 110. The telematics control unit 160 then determines in step 320 whether to select a new filter, based on user input and/or other factors. By way of example, the user may initiate a hands-free call to a live operator, and then have the call transferred to IVR. At this point, the user will want to be able to change filters. Thus, if the telematics control unit 160 determines in step 320 that a new filter is requested, the telematics control unit 160 selects a subsequent filter in step 340, and filters the wireless connection therewith in step 350.

If, in step 310 and/or 320, a user requests filter adjustment not requiring a different filter (e.g., by issuing a voice command such as "INCREASE FILTER SLOPE"), the telematics control unit 160 then adjusts the filter parameter accordingly in step 330. The telematics control unit 160 then filters a voice input for the wireless connection with the adjusted filter in step 350.

As described, the present invention can select between a plurality of filters (e.g., two or more) to filter a voice input for the wireless connection with the most appropriate, and thus most optimized, filter. Moreover, the present invention may adjust the filter after selection by selecting an entirely different filter or by adjusting filter parameters of the selected filter, thereby further optimizing the filtering of the voice input for the wireless connection. Thus, the above described embodiments have an advantage of adaptively filtering a voice input for a wireless communication signal with a filter specifically configured for the connection at hand. As such, the above described embodiments do not suffer from use of only one factory installed/pre-set filter, which compromises filtering for different types of connections in order to uniformly filter communication to/from the vehicle. Hence, performance of the telematics system is improved, and the user may enjoy a greater degree of clarity and error free communication with both the phone call feature and the telematics call feature.

For example, because the noise cancellation ratio can be adjusted by the driver, this ratio can be optimized for hands-free phone voice quality by filtering out more noise during a phone call, while eliminating unnecessary (or harmful) filtering for a telematics call.

Thus, methods and apparatuses for performing noise control in a telematics system on a vehicle according to the present invention have been described. Many modifications and variations may be made to the techniques and structures described and illustrated herein without departing from the spirit and scope of the invention, such as transmitting and verifying a user identification on a server as part of a call setup procedure. Accordingly, it should be understood that the methods and apparatus described herein are illustrative only and are not limiting upon the scope of the invention.

What is claimed is:

1. A telematics communication system for a mobile platform, comprising:
   a wireless communicator for wirelessly communicating with a service provider; and
   a controller electrically coupled to the wireless communicator,
   wherein the controller is adapted to perform the following for a wireless connection from a mobile platform to the service provider:
      to determine whether the wireless connection is a phone call or an integrated voice recognition (IVR) call;
      to select one of a phone call filter when it is determined that the wireless connection is the phone call and an IVR filter when it is determined that the wireless connection is the IVR call based on the wireless connection determination; and
      to filter a voice signal for the wireless connection with the selected filter, and wherein a noise level specification filtered by the IVR filter is less than a noise level specification filtered by the phone call filter.

2. The telematics communication system of claim 1, wherein the mobile platform comprises an automobile.

3. The telematics communication system of claim 1, wherein the wireless communicator comprises at least one of a radio transmitter/receiver, a cellular transmitter/receiver, and a satellite transmitter/receiver.

4. The telematics communication system of claim 1, wherein the controller is further adapted to perform the following at least upon termination of the wireless connection from the mobile platform to the service provider:
   to determine whether a subsequent wireless connection is required;
   to determine whether any subsequent wireless connection is a phone call or an IVR call;
   to select one of the phone call filter and the IVR filter based on the subsequent wireless connection determination; and
   to filter a voice signal for the subsequent wireless connection with the subsequently selected filter.

5. The telematics communication system of claim 1, wherein the controller is further adapted:
   to determine whether a filter adjustment is required; and
   if filter adjustment is required, to change a filter parameter of the selected filter.

6. The telematics communication system of claim 5, wherein the filter parameter comprises one of a noise cancellation ratio, an echo cancellation ratio, a talking volume adjustment, and a filter slope.

7. The telematics communication system of claim 1, wherein the controller is further adapted:
   to determine whether a filter adjustment is required; and
   if filter adjustment is required, to select a subsequent filter, and wherein the controller filters the wireless connection with the subsequent filter.

8. The telematics communication system of claim 1, wherein the phone call is a hands-free phone call.

9. The telematics communication system of claim 1, wherein the noise level specification comprises at least one of a noise cancellation ratio, an echo cancellation ratio, a talking volume adjustment, and a filter slope.

10. The telematics communication system of claim 1, wherein the voice signal includes a user's voice.

11. A method of exchanging information in a wireless network, comprising:
    determining whether a wireless connection from a mobile platform to a server is a phone call or an integrated voice recognition (IVR) call;
    selecting one of a phone call filter when it is determined that the wireless connection is the phone call and an IVR filter when it is determined that the wireless connection is the IVR call based on the wireless connection determination; and
    filtering a voice signal for the wireless connection with the selected filter and
    wherein a noise level specification filtered by the IVR filter is less than a noise level specification filtered by the phone call filter.

12. The method of claim 11, further comprising:
    initiating the wireless connection from the mobile platform to the server.

13. The method of claim 12, wherein initiating the wireless connection comprises:
    selecting the IVR call;
    transmitting a user identification (ID) to the server; and
    verifying the user identification (ID) on the server.

14. The method of claim 11, wherein the mobile platform comprises an automobile.

15. The method of claim 11, wherein the wireless connection comprises at least one of a radio channel, a cellular channel, and a satellite channel.

16. The method of claim 11, further comprising, upon termination of the wireless connection:
    determining whether a subsequent wireless connection is required;
    determining whether any subsequent wireless connection is a phone call or an IVR call;
    selecting one of the phone call filter and the IVR filter based on the subsequent wireless connection determination; and
    filtering a voice signal for the subsequent wireless connection with the subsequently selected filter.

17. The method of claim 11, further comprising:
    determining whether a filter adjustment is desired; and
    if filter adjustment is desired, changing a filter parameter of the selected filter.

18. The method of claim 17, wherein the filter parameter comprises one of a noise cancellation ratio, an echo cancellation ratio, a talking volume adjustment, and a filter slope.

19. The method of claim 11, further comprising:
    determining whether a filter adjustment is desired; and
    if filter adjustment is desired, selecting a subsequent filter, wherein filtering the wireless connection filters the wireless connection with the subsequent filter.

20. A telematics communication system, comprising:
    means for wirelessly communicating between a mobile platform and a server; and
    means for selectively filtering a voice signal for the wireless communication with one of a phone call filter and an integrated voice recognition (IVR) filter, wherein a noise level specification filtered by the IVR filter is less than a noise level specification filtered by the phone call filter.

21. The telematics communication system of claim 20, wherein the mobile platform comprises an automobile.

22. The telematics communication system of claim 20, wherein the means for wirelessly communicating communicates via one of a radio channel, a cellular channel, and a satellite channel.

* * * * *